United States Patent
Batra et al.

(10) Patent No.: US 10,127,933 B2
(45) Date of Patent: Nov. 13, 2018

(54) MULTI-TRACK READER FOR IMPROVED SIGNAL TO NOISE RATIO

(71) Applicant: Western Digital Technologies, Inc., Irvine, CA (US)

(72) Inventors: Sharat Batra, Plymouth, MN (US); Jonathan D. Coker, Rochester, MN (US); Travis R. Oenning, Rochester, MN (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/674,952

(22) Filed: Aug. 11, 2017

(65) Prior Publication Data

US 2017/0365280 A1    Dec. 21, 2017

Related U.S. Application Data

(63) Continuation of application No. 14/194,552, filed on Feb. 28, 2014, now Pat. No. 9,741,369.

(51) Int. Cl.
*G11B 5/39*  (2006.01)
*G11B 5/29*  (2006.01)
(Continued)

(52) U.S. Cl.
CPC .................. *G11B 5/29* (2013.01); *G11B 5/33* (2013.01); *G11B 5/39* (2013.01); *G11B 5/3945* (2013.01);
(Continued)

(58) Field of Classification Search
CPC .......... G11B 5/33; G11B 5/39; G11B 5/3945; G11B 5/3951; G11B 5/3977
(Continued)

(56) References Cited

U.S. PATENT DOCUMENTS

| | | |
|---|---|---|
| 5,309,305 A | 5/1994 | Nepela et al. |
| 5,508,868 A | 4/1996 | Cheng et al. |

(Continued)

FOREIGN PATENT DOCUMENTS

| | | |
|---|---|---|
| EP | 2 657 936 | 10/2013 |
| JP | 2011-134372 | 7/2011 |

(Continued)

OTHER PUBLICATIONS

Combined Search and Examination Report from European Application No. GB1502820.2, dated Jul. 27, 2015.
(Continued)

*Primary Examiner* — Jefferson Evans
(74) *Attorney, Agent, or Firm* — Foley & Lardner LLP

(57) ABSTRACT

A system according to one embodiment includes a magnetic head having a plurality of sensors arranged to simultaneously read at least three immediately adjacent data tracks on a magnetic medium, wherein none of the sensors share more than one lead with any other of the sensors. Such embodiment may be implemented in a magnetic data storage system such as a disk drive system, which may include a magnetic head, a drive mechanism for passing a magnetic medium (e.g., hard disk) over the magnetic head, and a controller electrically coupled to the magnetic head.

20 Claims, 15 Drawing Sheets

(51) Int. Cl.
  *G11B 20/10* (2006.01)
  *G11B 5/33* (2006.01)
  *G11B 5/012* (2006.01)
  *G11B 5/09* (2006.01)

(52) U.S. Cl.
  CPC .......... *G11B 5/3948* (2013.01); *G11B 5/3951* (2013.01); *G11B 5/3958* (2013.01); *G11B 5/3977* (2013.01); *G11B 20/10009* (2013.01); *G11B 20/10305* (2013.01); *G11B 5/012* (2013.01); *G11B 5/09* (2013.01)

(58) Field of Classification Search
  USPC ........................................ 360/314, 316, 322
  See application file for complete search history.

(56) References Cited

U.S. PATENT DOCUMENTS

| | | | |
|---|---|---|---|
| 5,721,008 A | 2/1998 | Huang et al. | |
| 6,717,780 B2* | 4/2004 | Hiramoto | B82Y 10/00 257/E21.665 |
| 6,970,331 B1 | 11/2005 | He et al. | |
| 7,382,569 B2 | 6/2008 | Biskeborn et al. | |
| 7,382,585 B1* | 6/2008 | Nibarger | G11B 5/00878 360/316 |
| 7,573,684 B2 | 8/2009 | Seigler et al. | |
| 8,208,228 B2 | 6/2012 | Maat et al. | |
| 8,711,517 B2* | 4/2014 | Erden | G11B 5/5552 360/121 |
| 8,786,987 B2* | 7/2014 | Edelman | G11B 5/29 360/314 |
| 8,891,207 B1 | 11/2014 | Li et al. | |
| 8,988,812 B1 | 3/2015 | Brunnett et al. | |
| 9,036,304 B1 | 5/2015 | Galbraith et al. | |
| 9,082,436 B1* | 7/2015 | Mashima | G11B 5/3929 |
| 9,099,125 B1* | 8/2015 | Hattori | G11B 5/3912 |
| 9,218,822 B1 | 12/2015 | Contreras et al. | |
| 9,218,823 B2* | 12/2015 | Kief | G11B 5/11 |
| 9,396,744 B1* | 7/2016 | Yamashita | G11B 5/3912 |
| 9,570,104 B1 | 2/2017 | Erden et al. | |
| 9,672,849 B2* | 6/2017 | Kief | G11B 5/3163 |
| 9,711,169 B2* | 7/2017 | Han | G11B 5/29 |
| 2002/0131217 A1 | 9/2002 | Nakashio et al. | |
| 2009/0154025 A1 | 6/2009 | Carey et al. | |
| 2013/0286502 A1 | 10/2013 | Erden et al. | |
| 2013/0286511 A1* | 10/2013 | Edelman | G11B 5/29 360/234.3 |
| 2014/0177102 A1* | 6/2014 | Kief | G11B 5/3163 360/128 |
| 2015/0098151 A1 | 4/2015 | Gadbois et al. | |
| 2015/0248900 A1* | 9/2015 | Batra | G11B 20/10009 360/45 |
| 2017/0365283 A1* | 12/2017 | Biskeborn | G11B 5/00813 |

FOREIGN PATENT DOCUMENTS

| | | |
|---|---|---|
| WO | WO-98/37550 | 9/1998 |
| WO | WO-2015/030676 | 3/2015 |

OTHER PUBLICATIONS

Erden, M. Fatih, "TDMR Roadmap," ASTC, IDEMA, Sep. 25, 2012, pp. 1-21.
Final Office Action issued on U.S. Appl. No. 14/194,552, dated Aug. 10, 2016.
Non-Final Office Action issued on U.S. Appl. No. 14/194,552, dated Jan. 29, 2016.
Notice of Allowance on U.S. Appl. No. 14/195,52, dated Aug. 3, 2017.
Office Action issued on Chinese Application 2015102042624, dated Jul. 27, 2017.
Office Action issued on Chinese Application 201510204262.4, dated Mar. 16, 2018, English translation only.

* cited by examiner

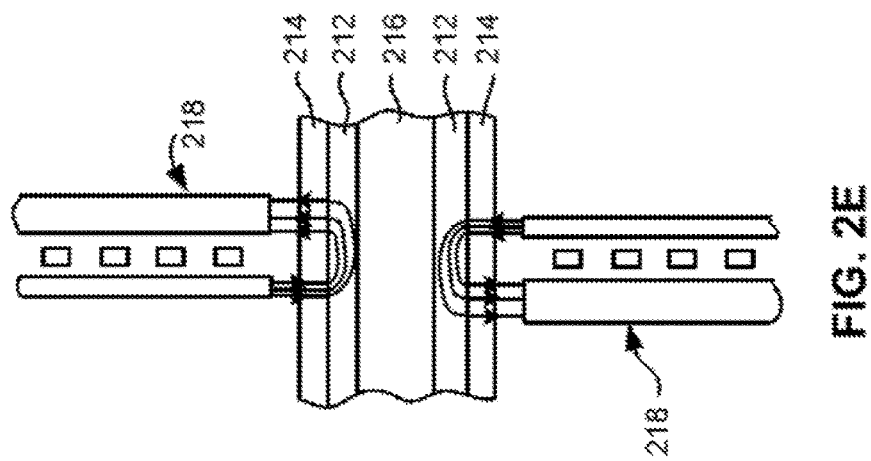
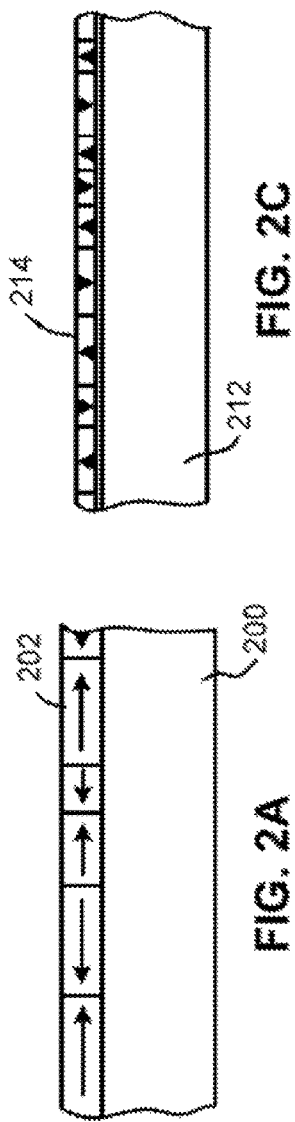
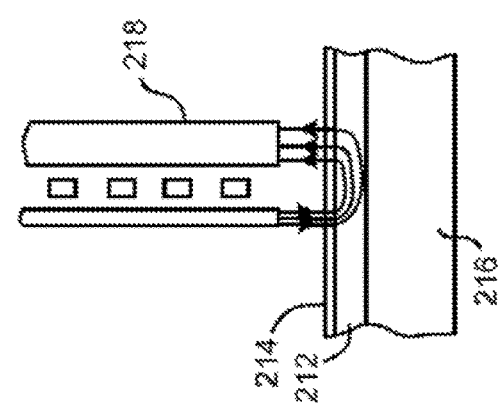
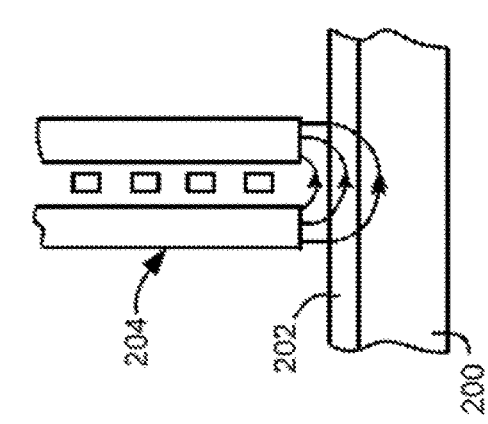

MULTI-TRACK READER FOR IMPROVED SIGNAL TO NOISE RATIO

CROSS-REFERENCE TO RELATED PATENT APPLICATIONS

This application is a continuation of U.S. application Ser. No. 14/194,552, filed on Feb. 28, 2014, the entirety of which is incorporated by reference herein.

FIELD OF THE INVENTION

The present invention relates to data storage systems, and more particularly, this invention relates to data readers having improved signal to noise ratio (SNR).

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing and reading magnetic transitions corresponding to the host data. The read and write heads are connected to signal processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. Particularly, attempts to increase achievable recording density of storage systems have also caused conventional products to experience an undesirable increase in noise when reading data stored therein.

Moreover, improvements to magnetic recording involve increasing reader resolution in the down-track and cross-track directions. However, reader resolution and SNR are strongly determined by reader sensitivity which has been the source of most improvements previously achieved in conventional products, but is now reaching the achievable limits thereby barring further advancement.

Additionally, conventional products have attempted to increase data read rates, e.g., to shorten data access time. However, such attempts have ultimately required spinning the HDD at higher revolutions per minute, thereby increasing power consumption and error rates while reading the data stored thereon.

It follows that conventional products have fallen short of developing viable improvements to the SNR. In sharp contrast, various embodiment described herein include data storage systems and methods that achieve improved SNR, as will be discussed in detail below.

SUMMARY

A system according to one embodiment includes a magnetic head having a plurality of sensors arranged to simultaneously read at least three immediately adjacent data tracks on a magnetic medium, wherein none of the sensors share more than one lead with any other of the sensors.

Such embodiment may be implemented in a magnetic data storage system such as a disk drive system, which may include a magnetic head, a drive mechanism for passing a magnetic medium (e.g., hard disk) over the magnetic head, and a controller electrically coupled to the magnetic head.

A system according to another embodiment includes a hard disk, a magnetic, head having at least three sensors arranged to simultaneously read at least three immediately adjacent data tracks on the hard disk, and a controller configured to simultaneously recover data from each of the sensors, the data corresponding to the data tracks on the hard disk.

Other aspects and advantages of the present invention will become apparent from the following detailed description, which, when taken in conjunction with the drawings, illustrate by of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Moreover, it should be noted that, as used herein, the term "about" with reference to some stated value refers to the stated value $\pm .10\%$ of said value.

The following description discloses several preferred embodiments of disk-based storage systems and/or related systems and methods for improved SNR, as well as operation and/or component parts thereof.

In one general embodiment, a system includes a magnetic head having a plurality of sensors arranged to simultaneously read at least three immediately adjacent data tracks on a magnetic medium, wherein none of the sensors share more than one lead with any other of the sensors.

In another general embodiment, a system includes a hard disk, a magnetic head having at least three sensors arranged to simultaneously read at least three immediately adjacent data tracks on the hard disk, and a controller configured to simultaneously recover data from each of the sensors, the data corresponding to the data tracks on the hard disk.

Figure 1:
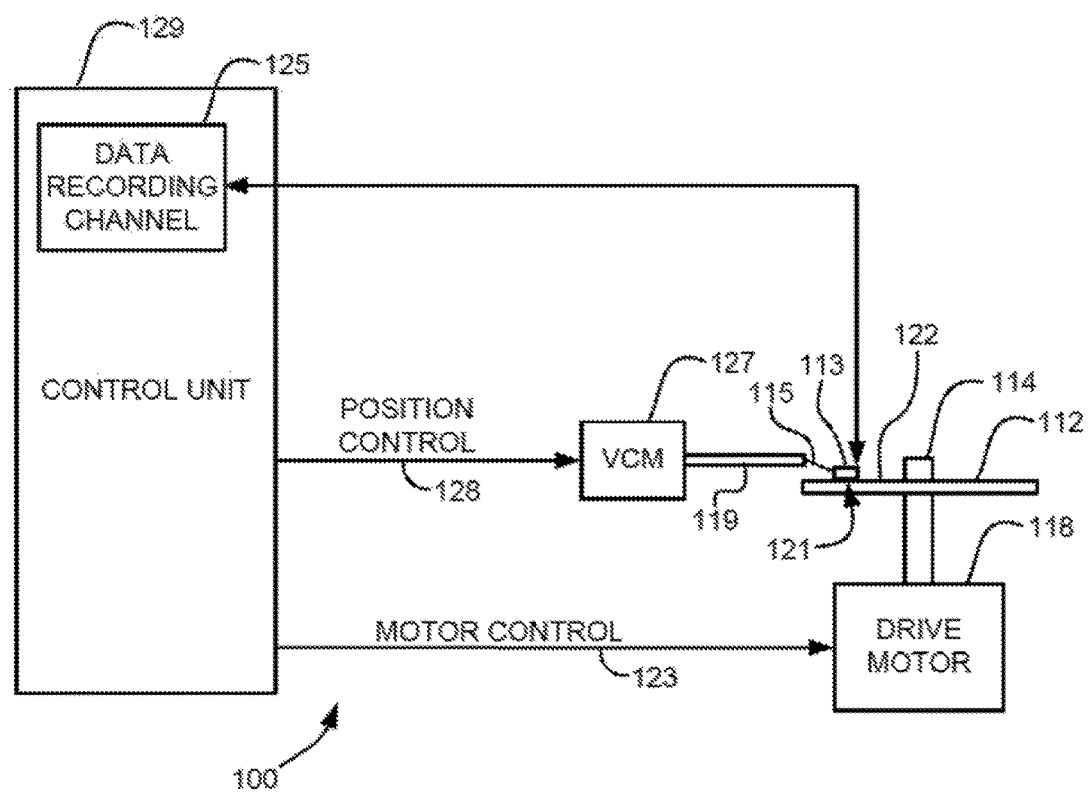
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by an drive mechanism which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring, force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125. The recording channel may include advanced signal processing circuits that employ coding, waveform shaping, 2D equalization and timing offset and detection algorithms to realize improved SNR, among other functions.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion winch extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as aluminum or glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the hues of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3B:
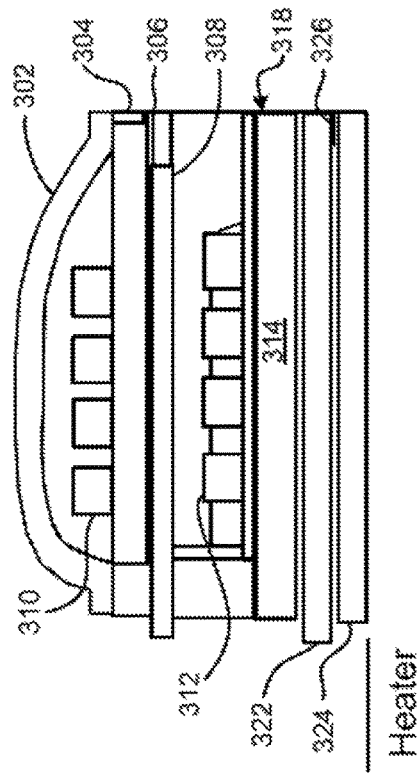
FIG. 3B is a cross-sectional view of one particular embodiment of a piggyback magnetic head with helical coils.
Figure 3A:
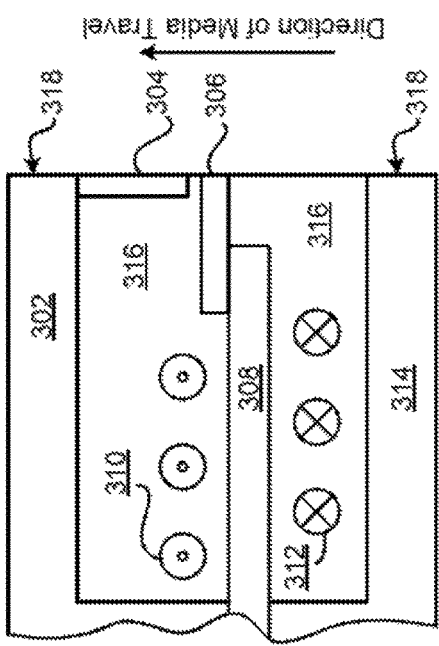
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing side 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the media facing side 318. The media facing side 318 is indicated across the right side of the structure.

Perpendicular writing is achieved by forcing flux through the stitch pole 308 into the main pole 306 and then to the surface of the disk positioned towards the media facing side 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4B:
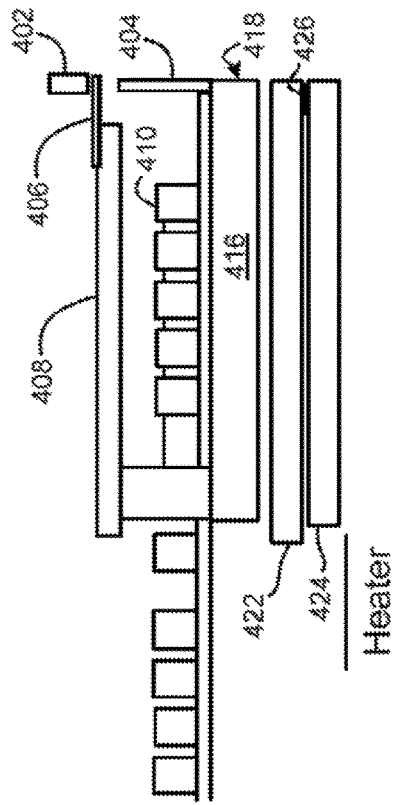
FIG. 4B is a cross-sectional view of one particular embodiment of a piggyback magnetic head with looped coils.
Figure 4A:
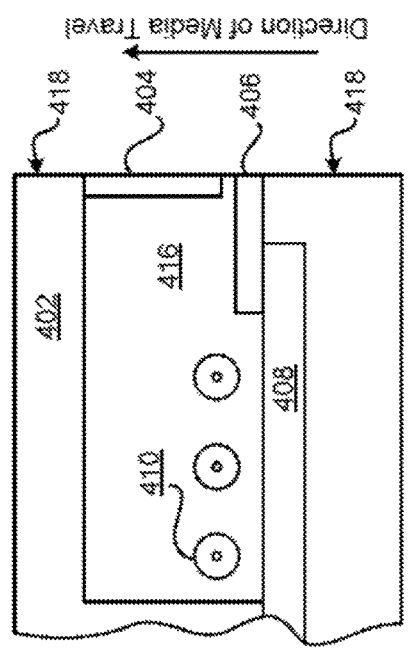
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flax to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing side 418. The direction of the media travel, as indicated by the arrow to the right of the structure, moves the media past the stitch pole 408, main pole 406, trailing shield 404 which may be connected to the wrap around shield (not shown), and finally past the upper return pole 402 all of which may or may not have a portion in contact with the media facing side 418). The media facing side 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410. which wraps around to form a pancake coil. Also, sensor shields 422, 424 are shown. The sensor 426 is typically positioned between the sensor shields 422, 424.

In FIGS. 3B and 4B, an optional heater is shown away from the media facing side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

As described above, previous attempts to increase achievable recording density of storage systems have also caused conventional products to experience an undesirable decrease in SNR when reading data stored in such storage systems. Additionally, attempts to increase data read rates, e.g., to shorten data access time have ultimately required spinning the HDD at higher revolutions per minute, thereby increasing power consumption and error rates of conventional products.

In sharp contrast, various embodiment described herein include data storage systems and methods that achieve improved signal to noise ratio (SNR), as will soon become apparent.

Figure 5A:
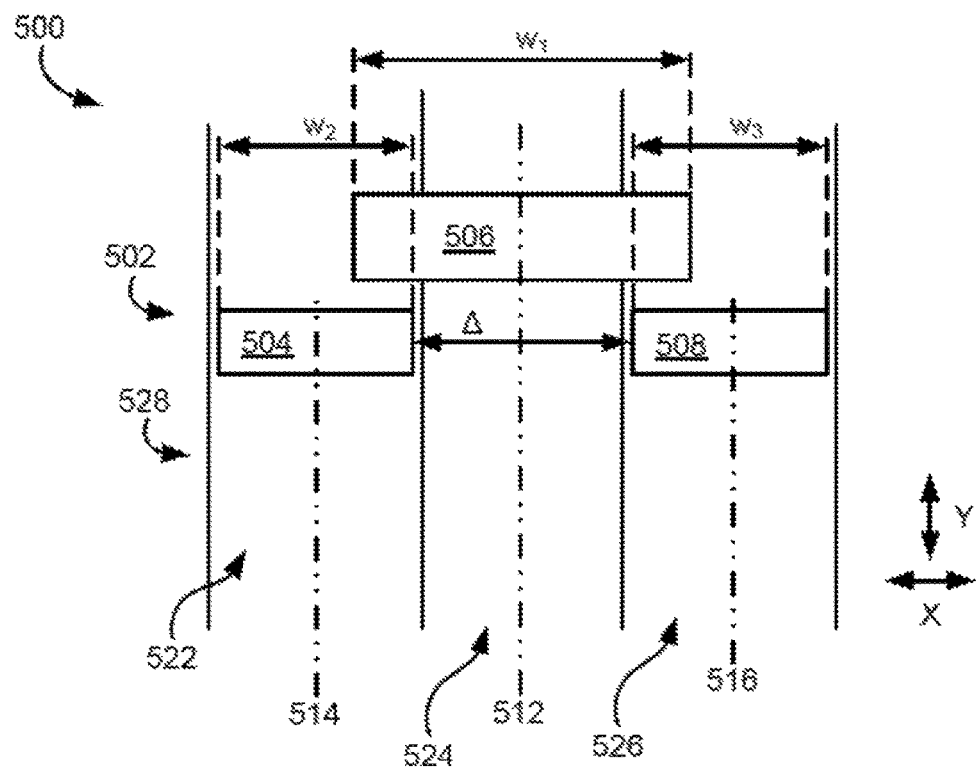
FIG. 5A is a representational diagram of a system according to one embodiment.
Figure 5B:
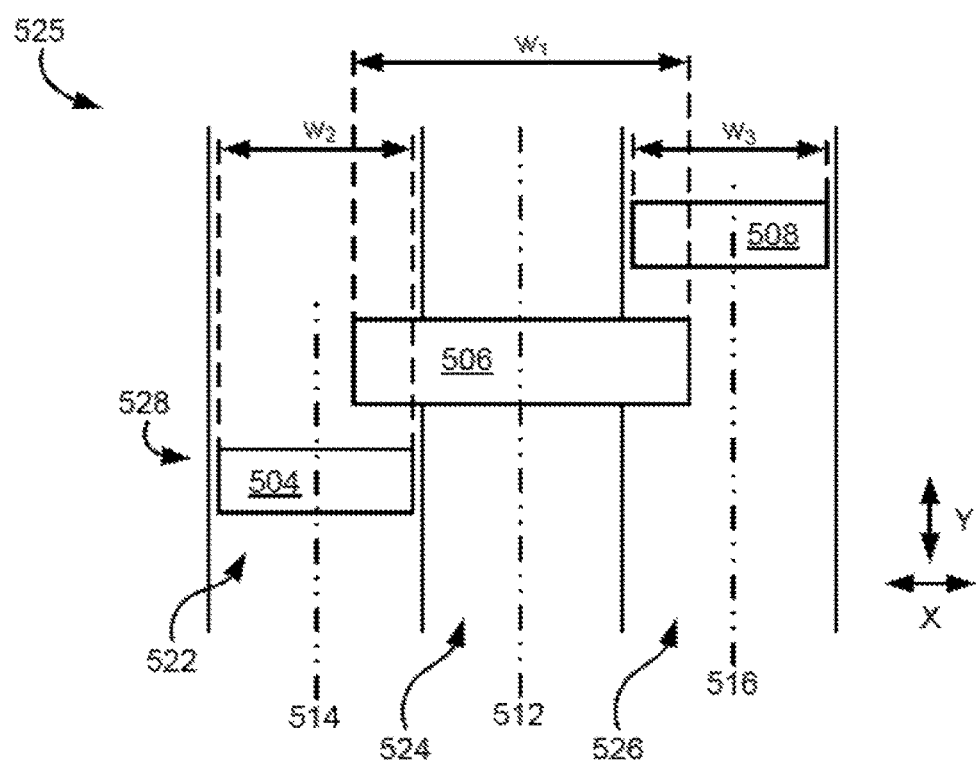
FIG. 5B is a representational diagram of a system according to one embodiment.
Figure 5C:
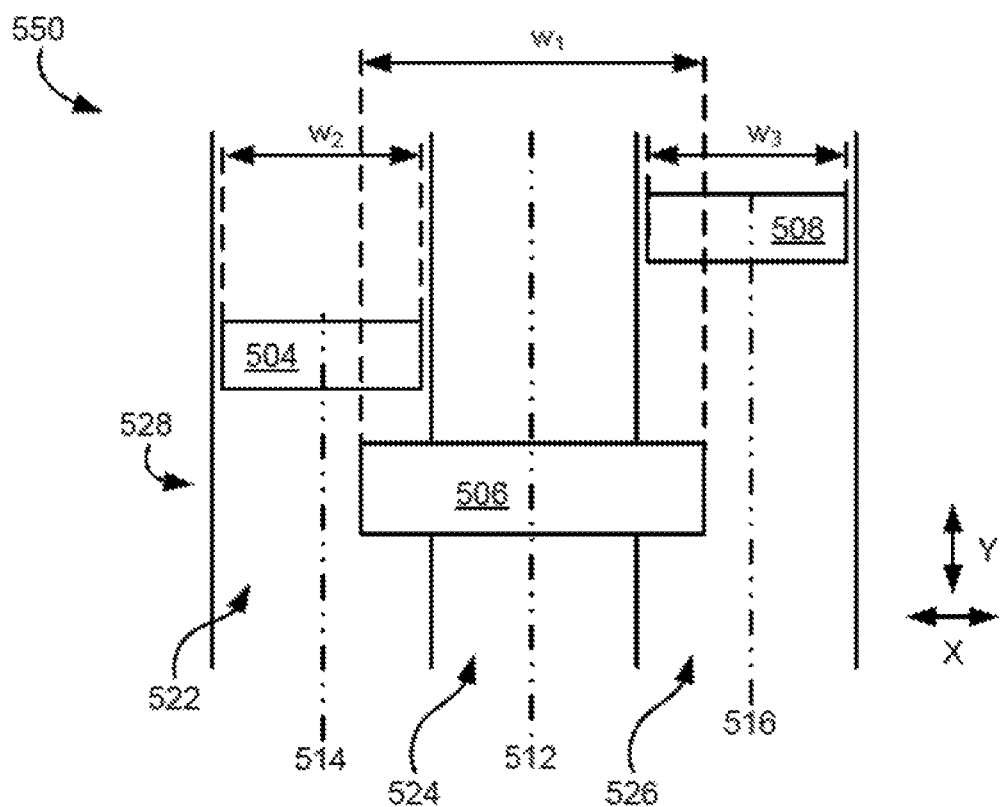
FIG. 5C is a representational diagram of a system according to one embodiment.

FIGS. 5A-5C depict representational diagrams of systems 500, 525, 550, in accordance with three embodiments. As an option, the present systems 500, 525, 550 may be implemented in conjunction with features from each other and/or any other embodiment listed herein, such as those described with reference to the other FIGS. Of course, however, such systems 500, 525, 550 and others presented herein may be used in various applications and/or in permutations which may or may not be specifically described in the illustrative embodiments listed herein. Further, the systems 500, 525, 550 presented herein may be used in any desired environment. Thus FIGS. 5A-5C (and the other FIGS.) should be deemed to include any and all possible permutations.

Referring now to FIGS. 5A-5C, the systems 500, 525, 550 include a magnetic head 502 having a plurality of sensors 504, 506, 508. According to different embodiments, the plurality of sensors 504, 506, 508 may include any data reader known in the art. For example, one or more of the sensors 504, 506, 508 may be a current in plane (CIP) GMR, current perpendicular to plane (CPP) tunnel barrier sensor, a CPP Giant Magnetoresistance (GMR) sensor, CPP scissor sensor (e.g., see FIG. 7B), etc. Thus, the plurality of sensors 504, 506, 508 are preferably able to detect magnetic transitions on an HDD, and thereby able to read data stored thereon. Although it is preferred that each of the plurality of sensors 504, 506, 508 are the same type of data reader, in some approaches two or more different types of data readers may be incorporated, depending, on the desired embodiment.

With continued reference to FIGS. 5A-5C, the plurality of sensors 504, 506, 508 are arranged to simultaneously read at least three immediately adjacent data tracks 522, 524, 526 on a magnetic medium 528, as will soon become apparent. In preferred approaches the magnetic medium 528 is a hard disk, but is not limited thereto.

As illustrated, the sensors 504, 506, 508 are positioned in multiple planes oriented along the height direction (perpendicular to media facing side, or out of the page of the drawing) and the cross-track direction X. The multiple planes in which the sensors 504, 506, 508 are positioned are also offset from each other in the track direction Y. As depicted, this allows for the sensors 504, 506, 508 to be oriented such that they overlap one another along the track direction Y.

By overlapping the sensors 504, 506, 508 in the track direction Y, at least a portion of two of the sensors 504, 506, 508 be on a same line oriented in the track direction Y, e.g., each plane may have one or more sensor therein. Thus, at least a portion of more than one sensor may be reading the same data track, thereby resulting in an improved SNR while reading data, as will be discussed in further detail below.

According to various approaches, the width $w_2$, $w_1$, $w_3$ of each sensor 504, 506, 508 is at least about 70%, more preferably at least about 90%, still more preferably at least about 100% of a center to center track pitch of the magnetic medium 528, but could be higher or lower. However, the width of at least one of the sensors is preferably wider than the center to center track pitch of the magnetic medium 528. Thus, one or more of the sensors 504, 506, 508 may have different dimensions than other sensors. This may further contribute to form overlap of the sensors 504 506, 508 in the track direction Y.

Referring still to the embodiments of FIGS. 5A-5C, one of the sensors 506 has a larger width $w_1$ in the cross-track direction X than the widths $w_2$, $w_3$ of the other sensors 504, 508 respectively. Depending on the desired embodiment, the larger width $w_1$ of sensor 506 may be from about 70% to about 120% of the center to center track pitch of the magnetic medium 528, but could be higher or lower, while the widths $w_2$, $w_3$ of the other sensors may be from about 70% to about 120% of the center to center track pitch.

Referring directly to the embodiment illustrated in FIG. 5A, the sensor 506 having a larger width $w_1$ is positioned generally between the other sensors 504, 508. Specifically, the centerline 512 (oriented in the track direction Y) of sensor 506 is positioned between centerlines 514, 516, of the other sensors 504, 508 respectively. As a result, sensor 506 overlaps the sensors 504, 508 in the track direction Y.

It is generally desirable to minimize spacing between the sensors along the track direction Y, which in turn, desirably reduces the effect of skew of the magnetic medium while reading data therefrom, e.g., caused by changes in the radial position of the head relative to the disk as the head is moved by the rotary actuator during use. In general, a preferred spacing between sensors in the track direction V is less than about 100 nm. See e.g., .alpha. in FIG. 6A. However, in further approaches, the separation between sensors of each plane in the track direction Y may be between about one and about two times a track pitch. As a result, the systems 500, 525, 550 may be able to access the at least three immediately adjacent tracks over an entire surface of the magnetic medium when a rotary actuator is used to position the magnetic head 502, as will be described in further detail below.

Furthermore, a spacing .DELTA. between adjacent sensors 504, 508 in the cross-track direction X may be less than 100%, more preferably 60% or less of the center to center track pitch of the magnetic medium 528. The choice of the spacing .DELTA. is further dictated by the skew range for the readers to access at least three immediately adjacent tracks.

Although two of the sensors 504, 508 are shown in FIG. 5A as lying along the same line in the cross-track direction X, according to other embodiments, each of the sensors 504, 506, 508 may lie along different lines oriented in the cross-track direction X. Looking specifically now to FIG. 5B, the system 525 illustrates an embodiment which is in no way intended to limit the invention. In system 525, the sensors 504, 506, 508 are positioned at different positions along the track direction Y, and therefore lie along different lines in the cross-track direction X. According to yet another exemplary embodiment, FIG. 5C illustrates a system 550 having a different configuration for the positions of the sensors 504, 506, 508. It follows that any of the sensors described and/or suggested herein may be positioned differently along the track direction Y, depending on the desired embodiment.

As mentioned above, by overlapping the sensors 504, 506, 508 in the track direction Y at least a portion of more than one sensor may be able to read the same data track, thereby resulting in an improved SNR. In preferred approaches, the data read by overlapping sensors may be used to overcome read errors and/or improve sensor read accuracy. For example, data corresponding to each of the data tracks on a magnetic medium read by the sensors 504, 506, 508 may be recovered using the embodiments described herein as will be described in further detail below.

Embodiments implementing overlapped sensors may include different designs and/or constructions. Specifically, FIGS. 6A-6F depict systems 600, 610, 620, 630, 640, 650 in accordance with several embodiments. As an option, the present systems 600, 610, 620, 630 may be implemented in conjunction with features from each other and/or any other embodiment listed herein, such as those described with reference to the other FIGS., such as FIGS. 5A-5C. Specifically, FIGS. 6A-6F illustrate variations of the embodiment of FIGS. 5A-5C depicting several exemplary configurations within a magnetic head 602. Accordingly, various components of FIGS. 6A-6F have common numbering with those of FIGS. 5A-5C.

Of course, however, such systems 600, 610, 620, 630 and others presented herein may be used in various applications and/or in permutations which may or may not be specifically described in the illustrative embodiments listed herein. Further, the systems 600, 610, 620, 630 presented herein may be used in any desired environment. Thus FIGS. 6A-6F (and the other FIGS.) should be deemed to include any and all possible permutations.

Referring now to FIGS. 6A-6F, the systems 600, 610, 620, 630 include a magnetic head 602 having a plurality of sensors 504, 506, 508 and leads 606, 608, 616. According to different embodiments, the plurality of se sots 504, 506, 508 may include any data reader known in the art. Thus, the plurality of sensors 504, 506, 508 are preferably able to detect magnetic transitions on an HDD, and are thereby able to read data stored thereon. Although it is preferred that each of the plurality of sensors 504, 506, 508 are the same type of data reader, in some approaches two or more different types of data readers may be incorporated, depending on the desired embodiment.

As illustrated, at least two of the sensors 504, 506, 508 share a common lead and are coupled to independent processing channels by independent leads. However, according to preferred embodiments none of the sensors 504, 506, 508 share more than one lead with any other of the sensors 504, 506, 508. Thus, one of the sensors 504, 506, 508 may share one common lead with another of the sensors 504, 506, 508. Yet, in another embodiment, none of the sensors 504, 506, 508 may share a lead.

Figure 6A:
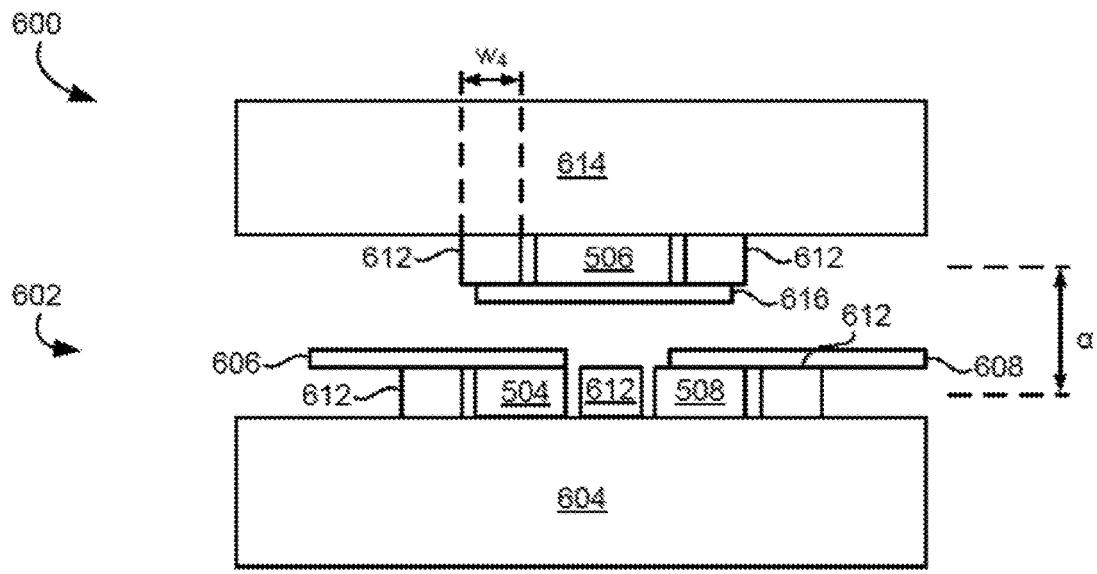
FIG. 6A-6F are partial representational views of systems having three sensors according to different embodiments.

Referring specifically now to FIG. 6A, the system 600 illustrates sensors 504, 508 sharing a common lead 604 (e.g., a shield) while also being coupled to independent processing channels not shown) by independent leads 606, 608. Furthermore, sensor 506 is coupled to independent leads 614 (e.g., a shield) and 616. According to various approaches, a lead may be of any type known in the art, such as a conventional lead, a shield, etc., depending on the desired embodiment.

Leads and/or independent processing channels are preferably coupled to a signal processing unit, which may be a component of a controller (e.g., see control unit 129 of FIG. 1). Depending on the desired embodiment, the signal processing unit may be able to perform different operations using the signals from one or more of the sensors, as will soon become apparent.

In one approach, the signal processing unit may be configured to apply a timing offset to signals from certain sensors in one or more different planes. For example, the signal processing unit may apply a timing offset to signals received from sensors 504, 508 which reside a different plane along the track direction Y than sensor 506. This preferably allows for the signal processing unit to compensate for the spatial offset .alpha. between sensors in the track direction Y. Without such timing offset, the signal from sensor 506 would undesirably be received before or after the signal from sensors 504, 508, depending on the direction of movement of magnetic medium (e.g., see 112 of FIG. 1).

According to another approach, the signal processing unit may be configured to apply two dimensional (2D) equalizer and advanced signal processing techniques of a type known in the art for reducing inter-track interference (ITI), to received data after tuning offset applied, and improving the signal to noise ratio. As described above, the sensors 504, 506, 508 preferably overlap in the track direction Y, thereby allowing overlapped sensors 504, 506, 508 to read at least a portion of two or more adjacent data tracks. Thus, a signal processing unit may implement 2D signal processing to differentiate between the data read from the two or more adjacent data tracks by a single sensor.

In yet another approach, a signal processing unit, which may be a component of a controller, may be configured to apply waveform shaping and/or detection to signals from sensors residing in one or more different planes in the track direction Y.

In preferred approaches, the data read by overlapping sensors may be used to overcome read errors and/or improve sensor read accuracy. According to an exemplary embodiment, a signal processing unit may be configured to simultaneously recover data corresponding to each of the data tracks on a magnetic medium, read by the sensors 504, 506, 508. However, according to another exemplary embodiment, which is in no way intended to limit the invention, the signal from each of the data tracks on a magnetic medium read by the sensors 504, 506, 508 may be used to recover the data of the data track corresponding to the center sensor 506, e.g., when there is high skew during reading.

Referring still to FIG. 6A, the system 600 further includes biasing layers 612 between each of the sensors 504, 506, 508 to provide magnetic stability. According to different approaches, biasing layers 612 may include any conventional hard and/or soft biasing material as would be appreciated by one skilled in the art upon reading the present description. Additionally, according to any of the approaches described herein, biasing layers 612 preferably include a width w.sub.4 from about 40% to about 50% of the center to center track pitch of a desired magnetic medium, but could be higher or lower, depending on the desired embodiment.

The biasing layers 612 desirably provide magnetic stability to the sensors in certain embodiments. Although other embodiments may include more or fewer biasing layers than those deputed in FIG. 6A, it is preferable that at least two of the sensors have a biasing layer therebetween. However, in yet other approaches, none of the sensors may have a biasing layer therebetween (e.g., see FIG. 7B).

Figure 6B:
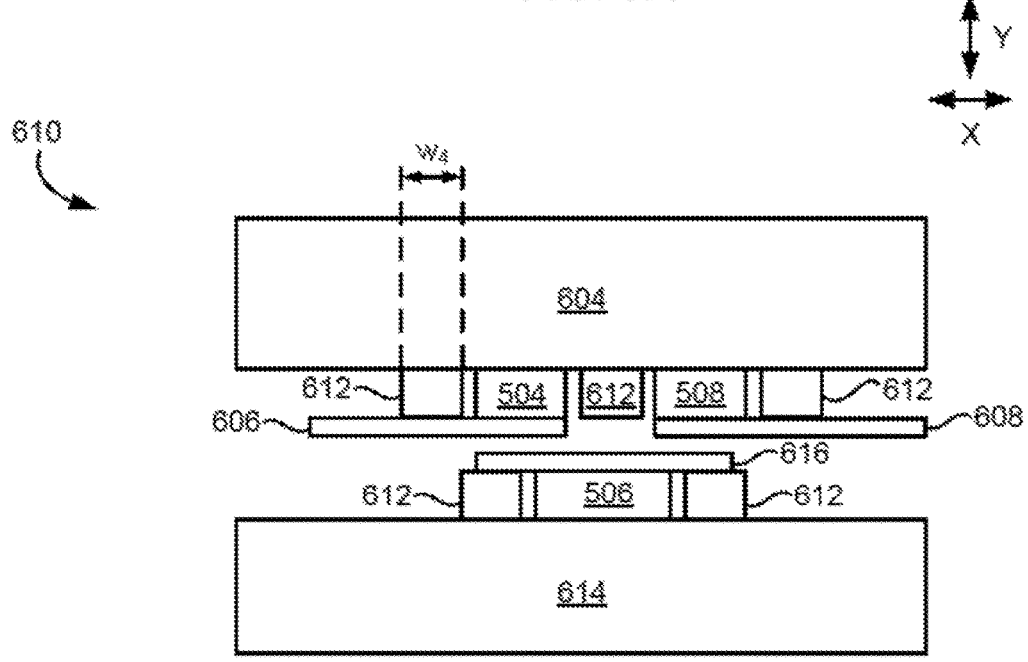

System 610 of FIG. 6B illustrates a variant configuration, having similar features to those of system 600 in FIG. 6A. It should be noted that, because system 610 includes similar features to those of system 600, system 610 may incorporate a method of construction having one or more similar and/or the same process steps as that which may be used to form system 600 in FIG. 6A, as will be described in further detail below (e.g., see FIGS. 9A-9E).

Figure 6C:
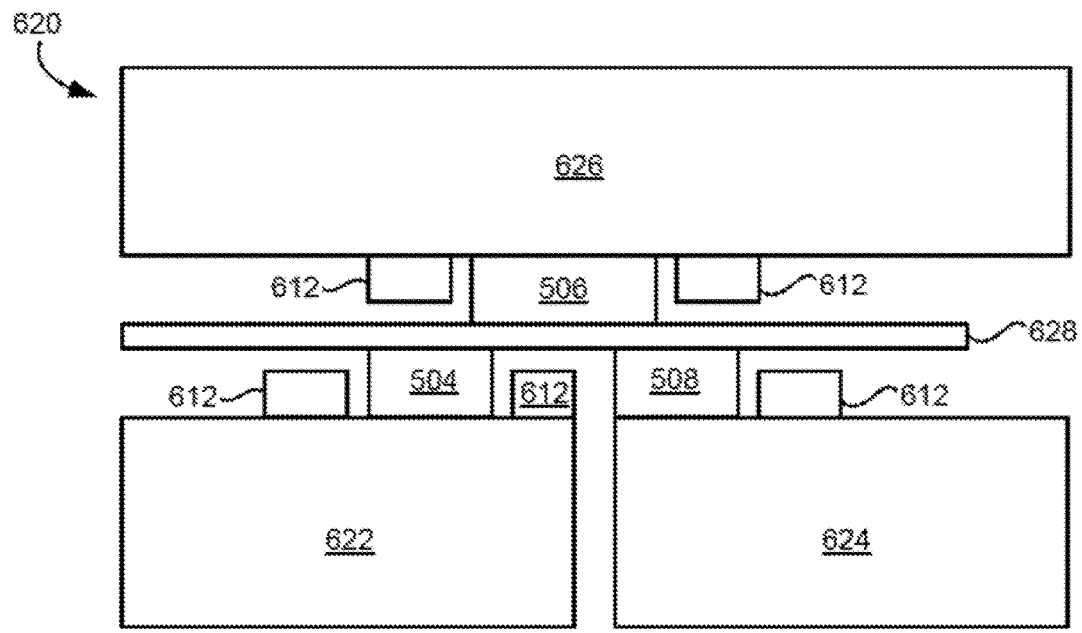

Looking now to FIG. 6C, the system 620 includes independent leads 622, 624 that are coplanar shields, coupled to sensors 504, 508 respectively. Independent leads 622, 624 may be coplanar magnetic shields having Fe or an alloy of Fe with at least one of Ni, Co, etc. However, in other embodiments, independent leads according to any of the embodiments described herein may include at least one of W, Ta, Rh, Ru, Cu, etc., and/or alloys thereof.

Additionally, sensor 506 is coupled to independent lead 626 which, according to the present embodiment, is a shield. It follows that because each of the sensors 504, 506, 508 are coupled to independent leads 622, 624, 626, they are able to use a common shared lead 628. Using a common shared lead 628 allows for reduced separation between the sensors 504, 506, 508 which, as described above, helps counteract relative skew between the head and the magnetic medium, thereby improving read quality while reading data from the magnetic medium.

Using a common shared lead 628 among sensors 504, 506, 508 also reduces the spacing, between sensors 504, 506 and 508. Using a common shared lead 628 among sensors 504, 506, 508 that is a magnetic shield desirably reduces the effective read gap of the system 620, thereby improving read quality, reducing read errors, etc.

Referring still to FIG. 6C, each of the sensors 504, 506, 508 are also illustrated as being separated by biasing layers 612. However, as described above, other embodiments may include more or fewer biasing layers than those depicted in FIG. 6C, depending on the desired embodiment.

Figure 6D:
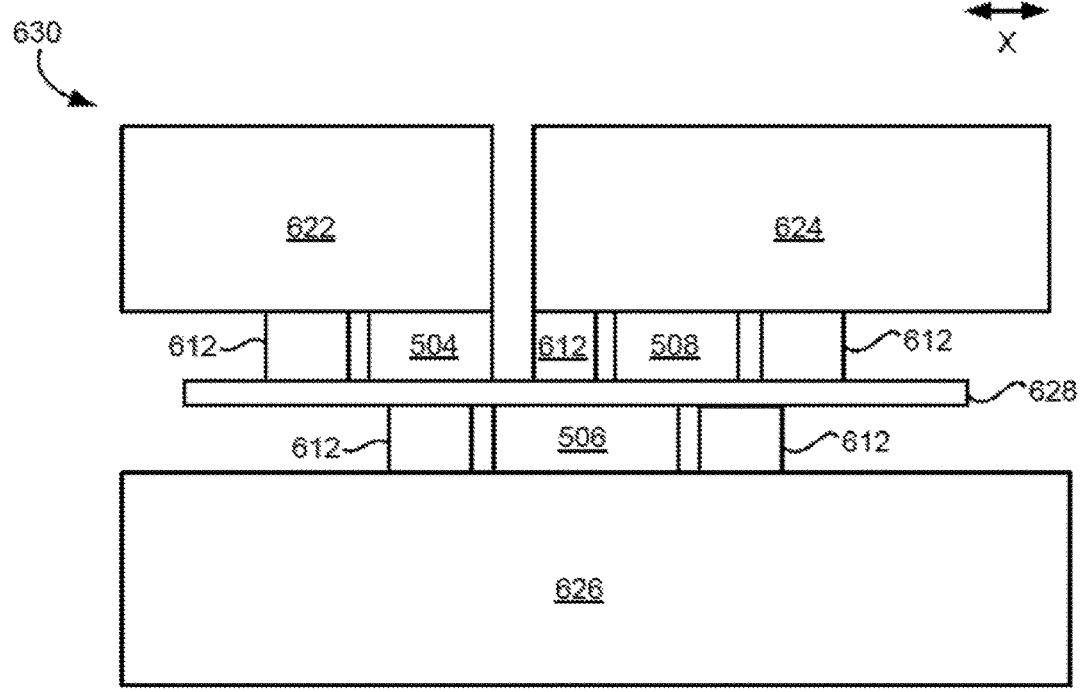

System 630 of FIG. 6D illustrates a variant configuration, having similar features to those of system 620 in FIG. 6C. It should be noted that, because system 630 includes similar features to those of system 620, system 630 may incorporate a method of construction having one or more similar and/or the same process steps as that which may be used to form system 620 in FIG. 6C, as will be described in further detail below (e.g., see FIGS. 9A-9E).

Figure 6E:
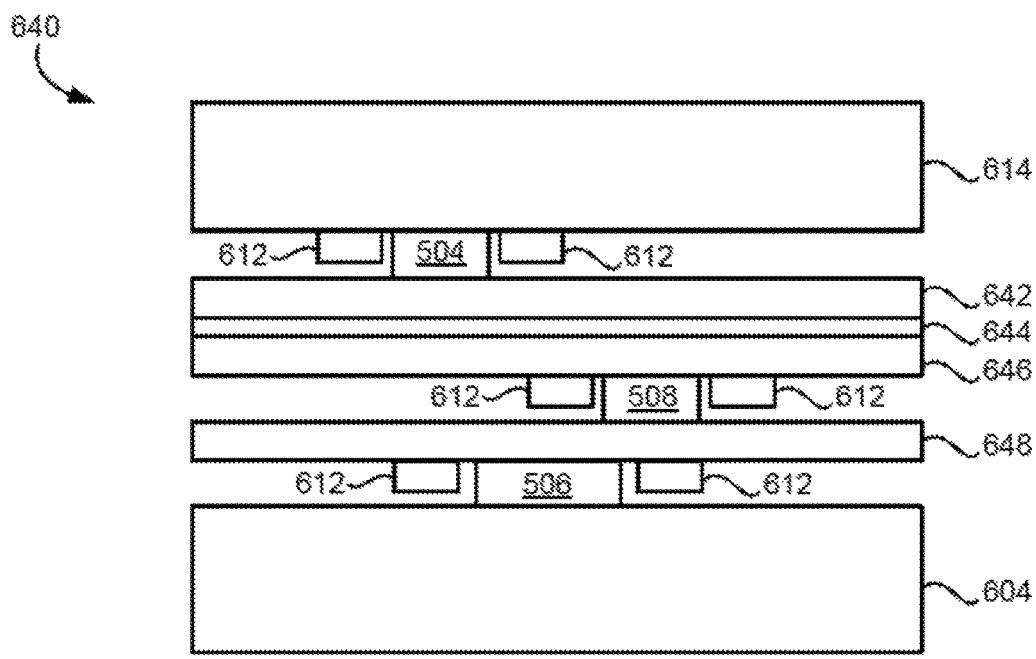

FIG. 6E depicts another system 640 according to an exemplary embodiment. As illustrated, system 640 includes shields 614, 604, sensors 504, 506, 508, and biasing layers 612. Furthermore, system 640 has a shared lead 648 in addition to independent leads 642, 646 that are separated by an insulating layer 644, which may include any insulating material that would be appreciated by one skilled in the art upon reading the present description.

In various approaches, all of the sensors may be electrically coupled to a common ground lead within the magnetic head. For example, in FIG. 6E, leads 648 and 614 may be coupled to a common ground. Accordingly, the head would need only three pads and a ground pad.

Figure 6F:
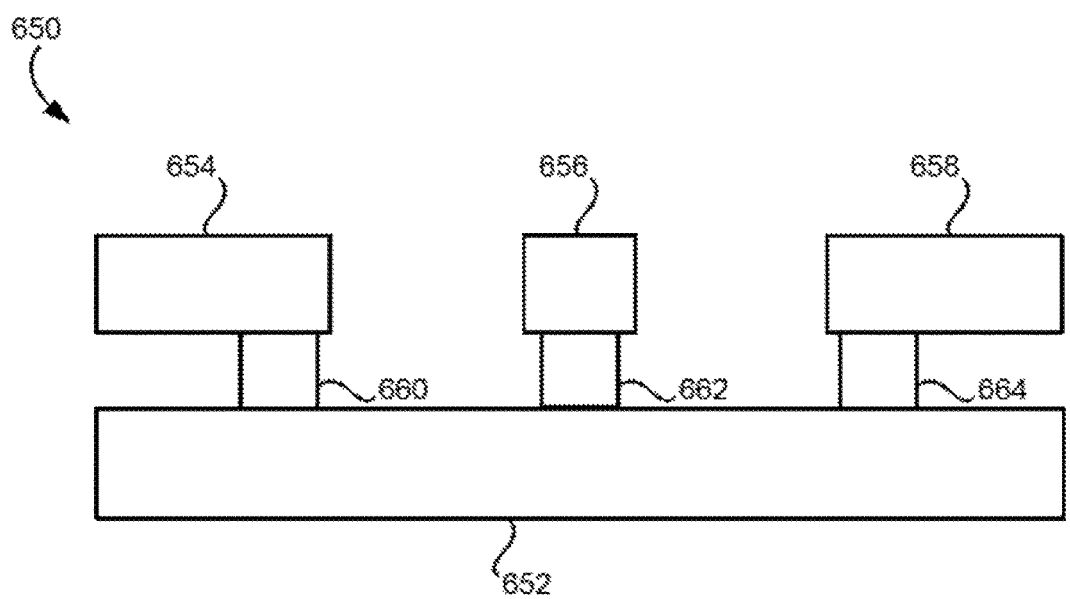

Further still, FIG. 6F depicts a system 650 having sensors 504, 506, 508 according to yet another embodiment. As illustrated, sensors 504, 506, 508 of system 650 have a common shield 652 in addition to independent shields 654, 656, 658 respectively, As described above, each of the systems 600, 610, 620, 630 illustrated in FIGS. 6A-6F include three sensors 504, 506, 508. However, according to other approaches, more than three sensors may be incorporated. For example, depending on the desired embodiment, a system may have at least three sensors, at least four sensors, at least five sensors, at least six sensors, etc.

Figure 7A:
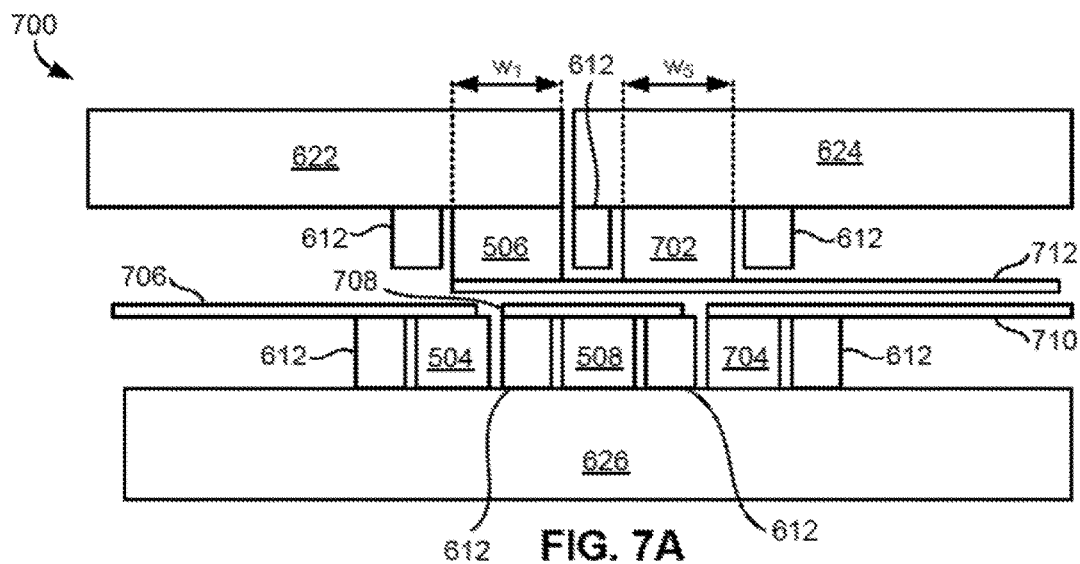
FIG. 7A-7B are partial representational views of systems having five sensors according to different embodiments.
Figure 7B:
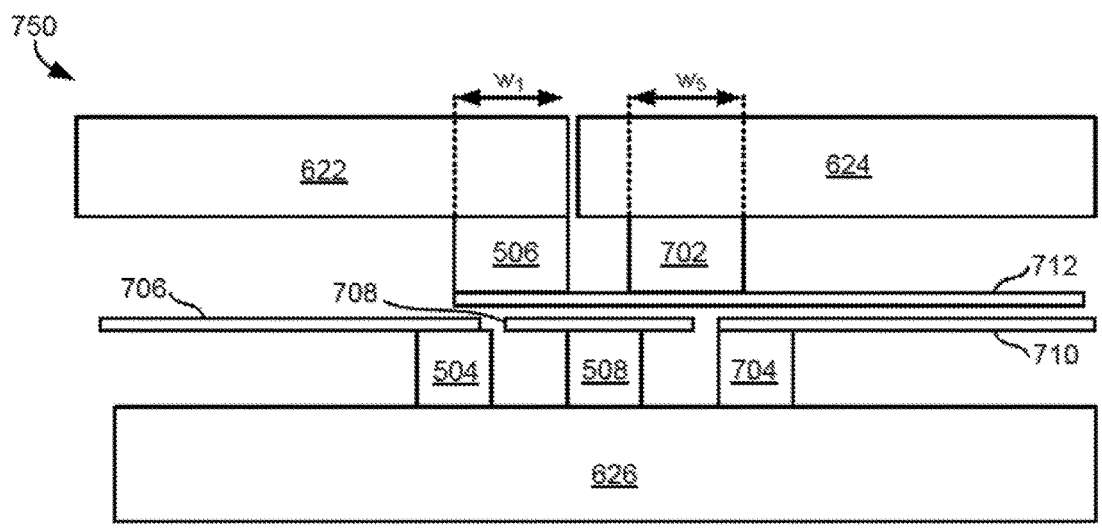

Looking to FIGS. 7A-7B, the systems 700, 750 include additional sensors according to two different embodiments. As an option, the present systems 700, 750 may be implemented in conjunction with features from each other and/or any other embodiment listed herein, such as those described with reference to the other FIGS., such as FIGS. 5-6F. Specifically, FIGS. 7A-7B illustrate variations of the embodiment of FIG. 5A-6F depicting several exemplary configurations. Accordingly, various components of FIGS. 7A-7B have common numbering with those of FIG. 5A-6F.

Of course, however, such systems 700, 750 and others presented herein may be used in various applications and/or in permutations which may or may not be specifically described in the illustrative embodiments listed herein. Further, the systems 700, 750 presented herein may be used in any desired environment. Thus FIGS. 700, 750 (and the other FIGS.) should be deemed to include any and all possible permutations.

Referring now to FIGS. 7A-7B, as mentioned above, the systems 700, 750 include additional sensors resulting in a total of five sensors 504, 506, 508, 702, 704. According to various approaches, any of the sensors 504, 506, 508, 702, 704 may include any of those sensors described above. Moreover, depending on the desired embodiment, one or more of the sensors 504, 506, 508, 702, 704 may be the same or different from the others.

The sensors 504, 506, 508, 702, 704 illustrated in FIGS. 7A-7B are preferably added to read more than three immediately adjacent data tracks on a magnetic medium. As described above, this desirably allows for improved SNR while reading data and allows for a reduced number or read errors.

Two of the sensors 506, 702 have larger widths $w_1$, $w_5$ respectively, in the cross-track direction X than the other sensors 504, 508, 704. As illustrated, this preferably allows for each of the sensors 504, 506, 508, 702, 704 to be overlapped in the track direction Y. Moreover, any of the sensors 504, 506, 508, 702, 704 may include any of the dimensions described and/or suggested herein.

Systems 700, 750 may further include a controller (e.g., see control unit 129 of FIG. 1) that may include a signal processing unit according to any of the approaches described above. Moreover, the controller may be coupled to the sensors 504, 506, 508, 702, 704 via leads 622, 624, 626, 706, 708, 710, 712.

According to one embodiment, the controller may be configured to apply a timing offset to signals from one or more of the sensors 504, 506, 508, 702, 704, apply 2D signal processing of a type known in the art for canceling ITI, simultaneously recover data corresponding to data tracks on a magnetic medium, etc.

Referring now to FIG. 7B, as mentioned above, none of the sensors illustrated in the system 750 include a biasing layers therebetween. Accordingly, in different approaches, one or more of the sensors 504, 506, 508, 702, 704 may be a scissor type sensor, as will be appreciated by one skilled in the art upon reading the present description, but is not limited thereto. Use of scissor type sensors enables closer spacing of the sensors in the cross-track direction, because the bias material is positioned behind the free layer with respect to the media facing side. Moreover, such sensors are more stable than other types when arranged in the depicted configurations. One or more of the sensors 504, 506, 508, 702, 704 of system 750 may include any of the sensors described herein, depending on the desired embodiment.

As apparent from the foregoing description, various approaches may include hard and/or soft bias materials located adjacent to and/or behind some or all of the sensors. As mentioned above, although various embodiments herein depict systems having different numbers of hard and/or soft bias layers, in yet other approaches, a system may include more or fewer biasing layers than those depicted herein.

FIGS. 8A-8J depict process steps of a method 800 for forming a magnetic head, in accordance with one embodiment. Note that additional layers may be present. Moreover, unless otherwise specified, the various layers in this and other embodiments may be formed using conventional processes.

As an option, the present method 800 may be implemented in conjunction with features from any other embodiment listed herein, such as those described with reference to the other FIGS. Of course, however, such method 800 and others presented herein may be used in various applications and/or in permutations which may or may not be specifically described in the illustrative embodiments listed herein. Further, the method 800 presented herein may be used in any desired environment. Thus FIGS. 8A-8J (and the other FIGS.) should be deemed to include any and all possible permutations.

Figure 8A:
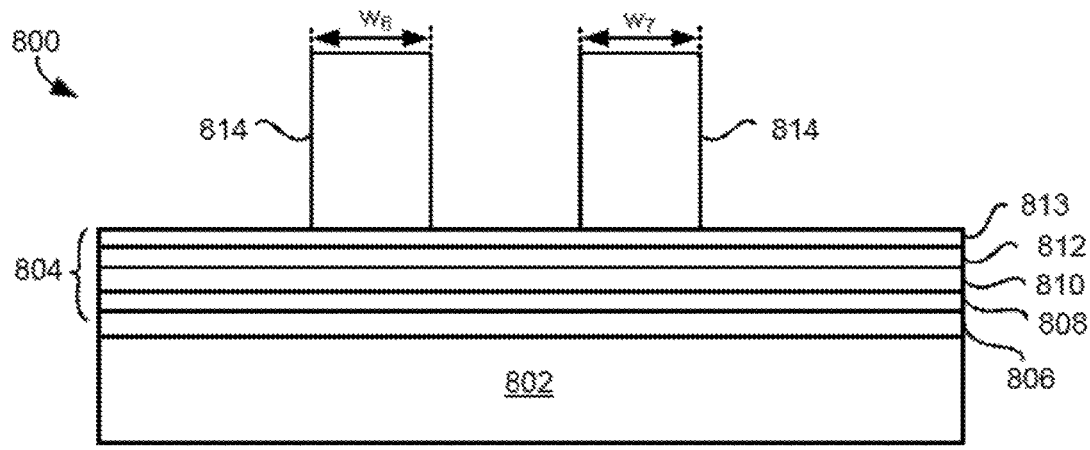
FIG. 8A-8J are process steps of a method according to one embodiment.

Referring now to FIG. 8A, the method 800 includes depositing a lead 802 (e.g., a shield) as well as a magnetoresistive (MR) stack 804. According to the present exemplary embodiment, which is in no way intended to limit the invention, the MR stack 804 includes an antiferromagnetic (AFM) layer 806, a pinned layer 808, a tunnel layer 810

(e.g., an MgO layer), a free layer 812, a cap layer 813 (e.g., to protect free layer 812), and masking layers 814.

As will soon become apparent, the masking layers 814 may be used to define the dimensions of the sensor structures 816, 817. Thus, the masking layers 814 are preferably patterned (e.g., formed) having widths $w_6$, $w_7$ about the same size as the center to center track pitch of a desired magnetic medium. Moreover, the spacing L between the adjacent sensor structures 816, 817 may be less than 75%, more preferably 60% or less of the center to center track pitch of the magnetic medium as described above.

Figure 8B:
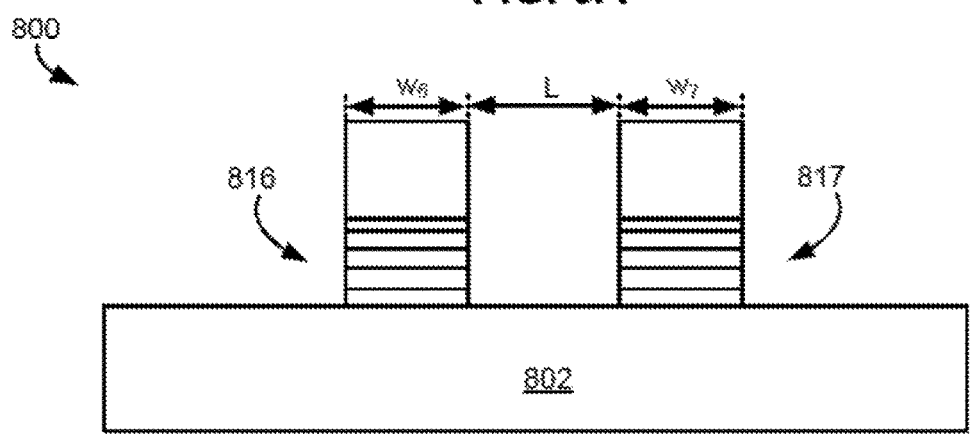

Looking to FIG. 8B, the method 800 further includes performing a reactive-ion etching (RIE) process step, of a type known in the art, on the exposed portions of the structure shown in FIG. 8A. The RIE step thereby forms the sensor structures 816, 817. According to a preferred approach, the RIE process may be stopped after removing the tunnel layer 810, thus leaving an extended pinned layer 808.

Figure 8C:
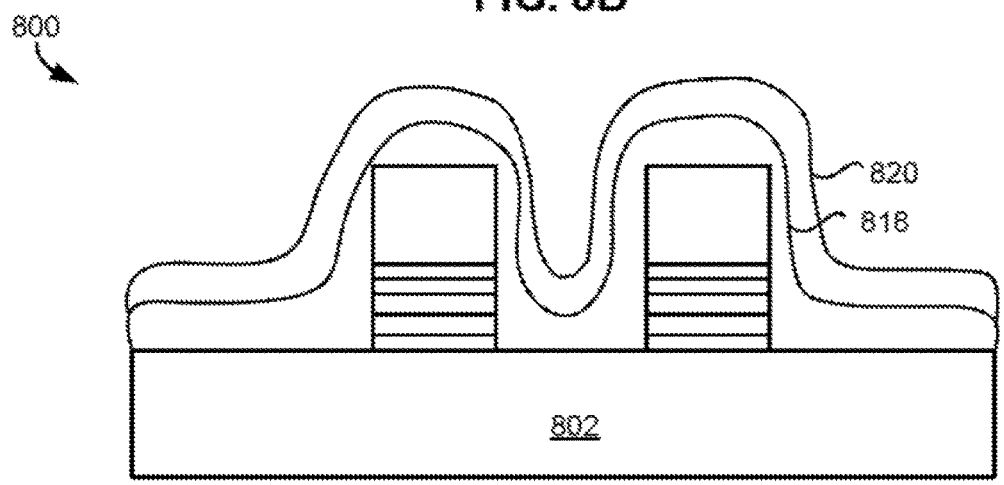

Moving to FIG. 8C, the method 800 includes depositing an insulating layer 818 and a biasing layer 820. As described above, the biasing layer 820 may be a hard bias layer or a soft bias layer, depending on the desired embodiment. The insulating layer 818 may include $Al_2O_3$ in one approach. However, according to various other approaches, the insulating layer 818 may include any insulating material known in the art.

Figure 8D:
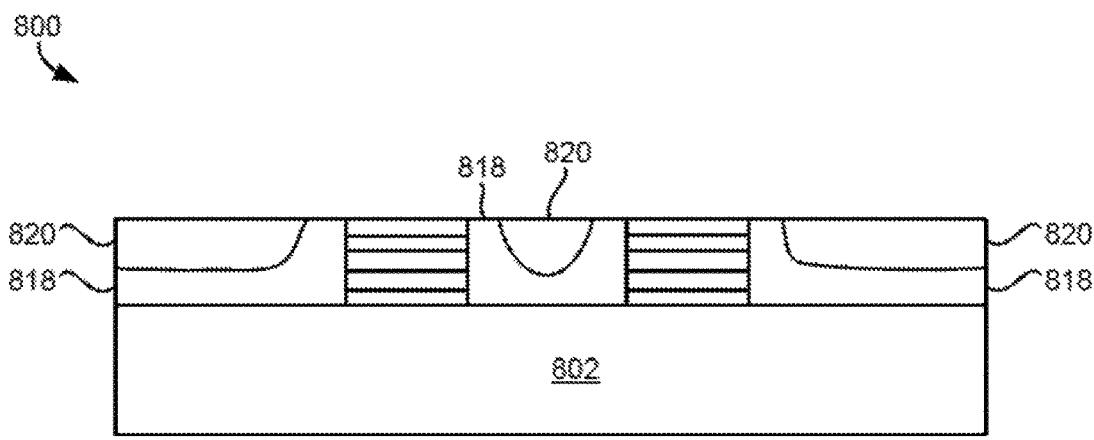

Method 800 further includes performing a liftoff procedure in addition to a Chemical Mechanical Planarization (CMP) step. As illustrated in FIG. 8D, these steps remove part of the insulating layer 818 and biasing layer 820, in addition to the masking layers 814, thereby stopping on the cap layer 813.

Figure 8E:
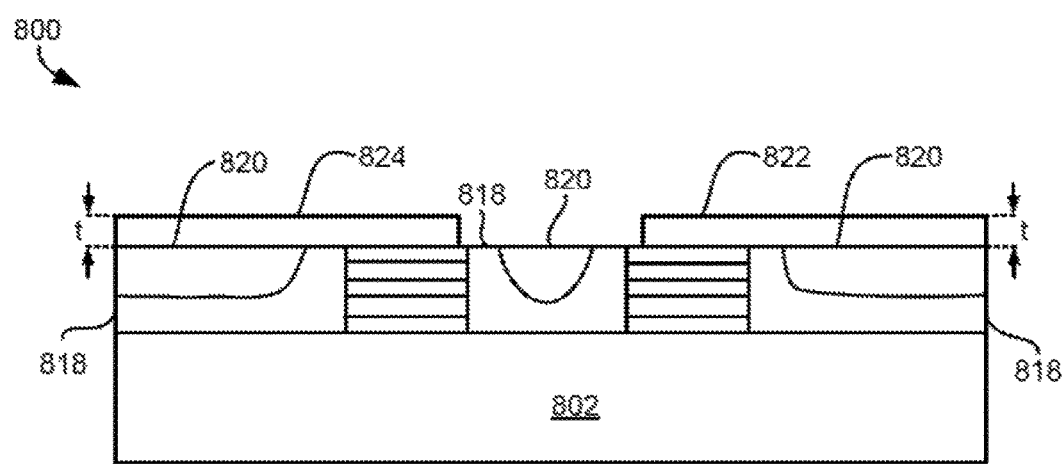

Furthermore, FIG. 8E includes depositing independent leads 822, 824. According to various approaches, one or lore of the leads may include a conducting material which may or may not be magnetic, e.g., nickel-iron, soft ferromagnetic materials, copper, chrome, tungsten, tantalum, etc., and/or combinations thereof depending on the desired embodiment. It should also be noted that leads 822, 824 preferably have a thickness t of at least about 30 nm. Without wishing to be bound by any theory, the inventors have found that magnetic leads having thicknesses of greater than about 30 nm will act, at least to some extent, as a shield.

Figure 8F:
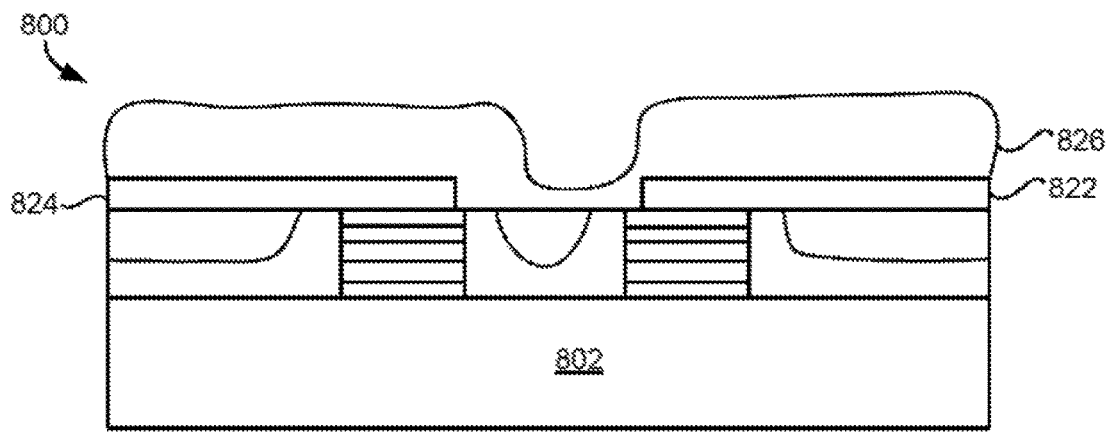

Looking now to FIG. 8F, the method 800 includes depositing an insulator layer 826. As described above, according to various approaches, insulating layer 826 may include any insulating material known in the art. Thus it may include, the same, or different material from insulating layer 818.

Figure 8G:
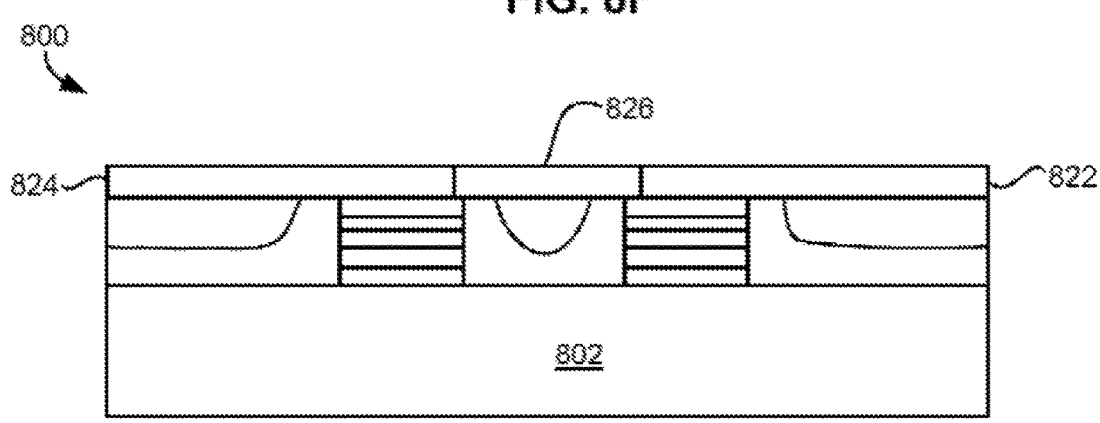
Figure 8H:
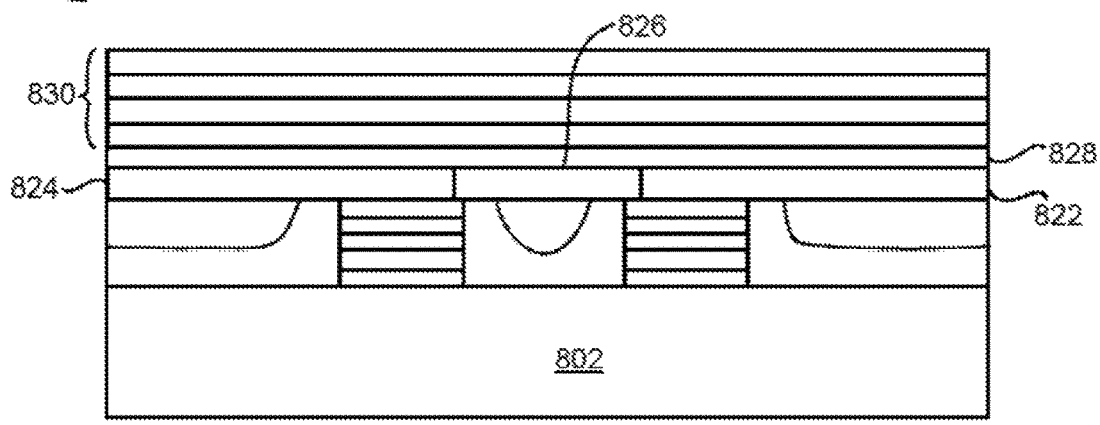

As illustrated in FIG. 8G. another CMP step is performed on the structure Moreover, referring now to FIG. 8H, method 800 further includes depositing an additional insulating layer 828 and MR stack 830. According to one approach, which is in no way intended to limit the invention, MR stack 830 may include one or more of the same dimensions, materials, order, etc. as the layers of MR stack 804. However, in other approaches, MR stack 830 may include different layers than MR stack 804, if more than one type of sensor is included in a given embodiment.

Figure 8I:
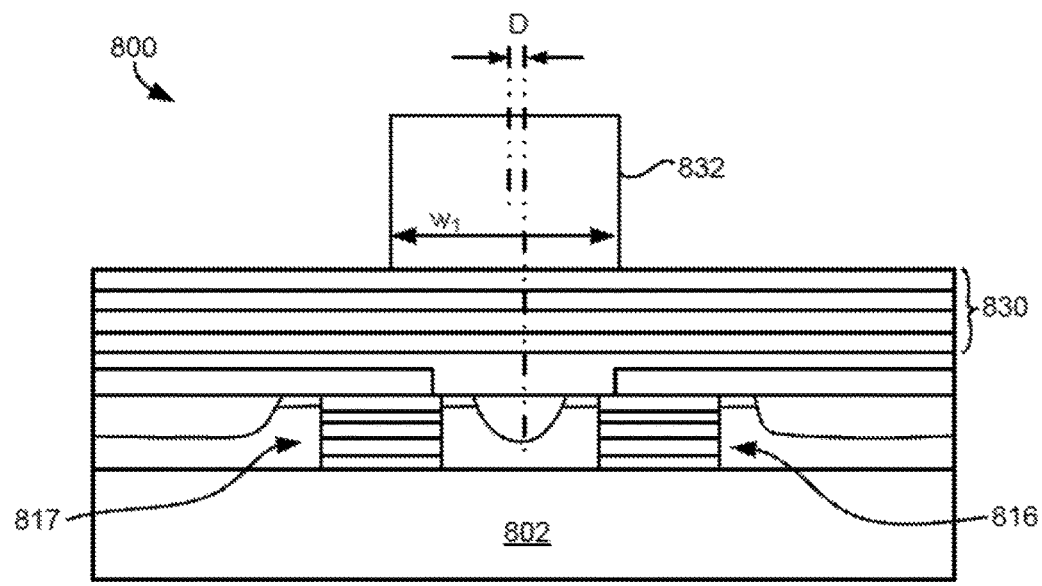

Looking to FIG. 8I, method 800 includes adding a masking layer 832 above MR stack 830. As described above with reference to FIG. 8A, the masking layer 832 may define the dimensions of one of the sensors. Thus, the masking layer 832 is preferably patterned (e.g., formed) having a width w1. Moreover, the masking layer 832 is preferably positioned such that the distance D between a centerline of the masking layer 832 is less than about 10 nanometers from a centerline between sensor structures 816 and 817 e.g., to prevent misalignment of the final sensor structures.

Method 800 further includes performing a RIE process, of a type known in the art, on the exposed portions of the structure shown in FIG. 8I. Additionally, an insulating layer 834 and a biasing layer 836 are deposited. As described above, the biasing layer 836 may be a hard bias layer or a soft bias layer, depending on the desired embodiment. Moreover, according to various approaches, the insulating layer 834 may include any insulating material known in the art.

Figure 8J:
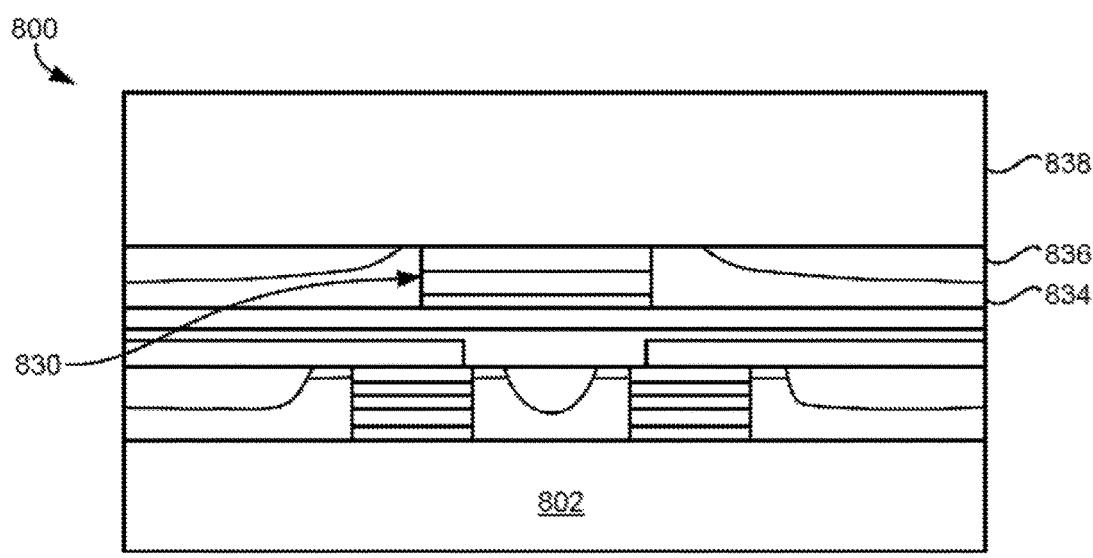

Further still, a liftoff procedure and a CMP step are performed. As illustrated in FIG. 8J, these steps remove part of the insulating layer 834 and biasing layer 836, in addition to the masking layer 832. A lead 838 (e.g., an upper shield) is thereby formed above the resulting structure, which may be the same, similar or different than lead 802.

Although the aforementioned method 800 includes steps of forming an embodiment having three sensor structures, similar process steps may be used to form any other embodiment described and/or suggested herein, e.g., the systems 700, 750 of FIGS. 7A-7B having five sensors. According to an exemplary embodiment, the process steps of method 800 illustrated in FIGS. 8A-8J above may be used to form a system having a common shared lead, as will be described in further detail below.

FIGS. 9A-9E depict process steps of a method 900 for forming a magnetic head having, a common shared lead, in accordance with one embodiment Note that additional layers may be present. Moreover, unless otherwise specified, the various layers in this and other embodiments may be formed using conventional processes.

As an option, the present method 900 may be implemented in conjunction with features from any other embodiment listed herein, such as those described with reference to the other FIGS., such as FIGS. 8A-8J. Specifically, FIGS. 9A-9E illustrate variations of the embodiment of FIGS. 8A-8J depicting process steps of forming a similar structure. Accordingly, various components of FIGS. 9A-9E have common numbering with those of FIGS. 8A-8J.

Of course, however, such method 900 and others presented herein may be used in various applications and/or in permutations which may or may not be specifically described in the illustrative embodiments listed herein. Further, the method 900 presented herein may be used in any desired environment. Thus FIGS. 9A-9E (and the other FIGS.) should be deemed to include any and all possible permutations.

Figure 9A:
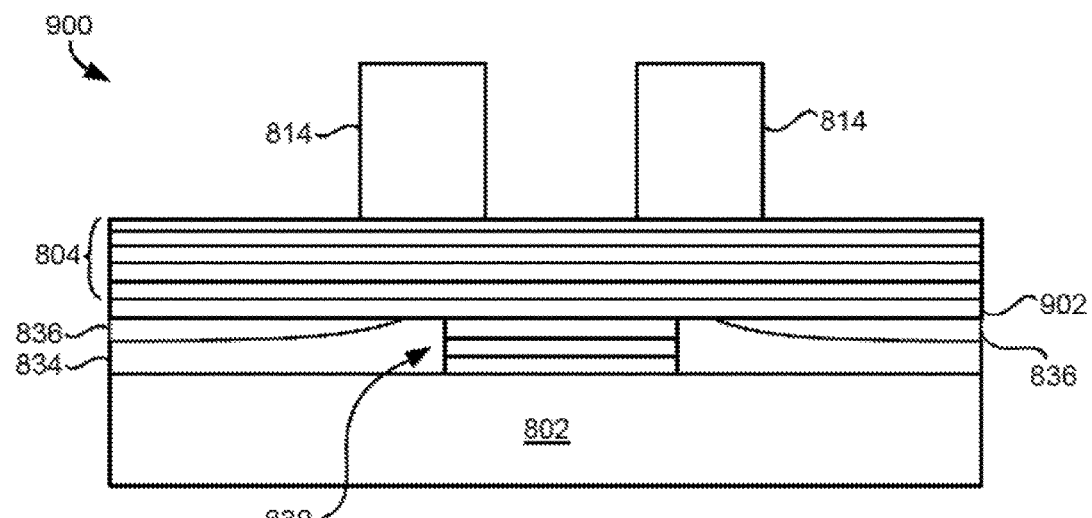
FIG. 9A-9E are process steps of a method according to one embodiment.

Referring now to FIG. 9A, as described above, the structure illustrated may be formed by implementing the process steps of FIGS. 8A-8J as would be appreciated by one skilled in the art upon reading the present description. However, it should be noted that in the present embodiment illustrated in FIG. 9A, the structure includes a common shared lead 902 in comparison to the independent leads 822, 824 formed in FIG. 8E. This preferably allows for the construction of a magnetic head having a common lead (e.g., see 628 of FIGS. 6C-6D).

Figure 9B:
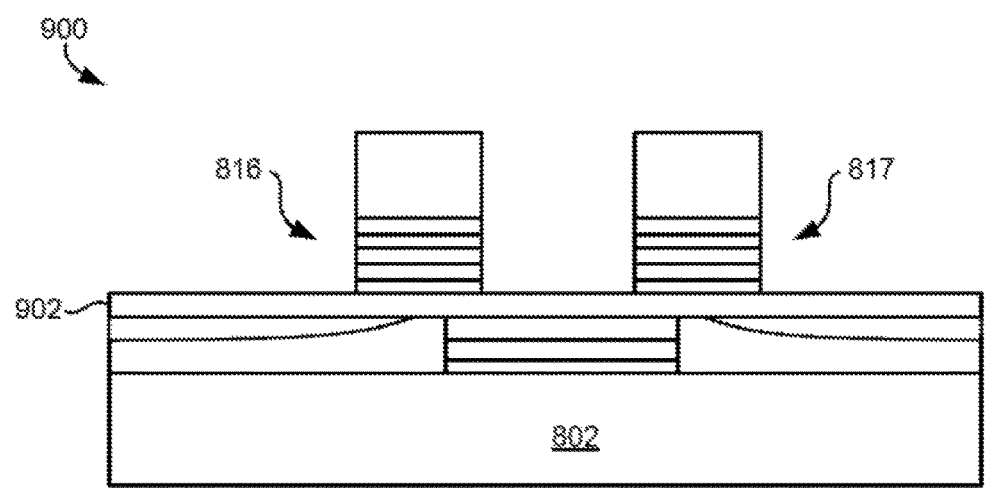

Looking now to FIG. 9B, method 900 includes performing a RIE process, of a type known in the art, on the exposed portions of the structure shown. According to a preferred approach, the ME process may be stopped before significantly affecting the common shared lead 902.

Figure 9C:
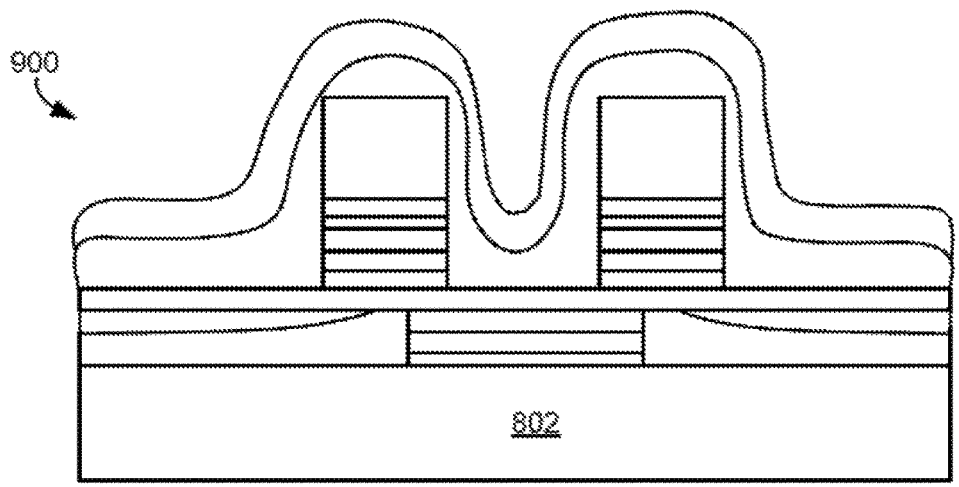

As shown in FIG. 9C, method 900 further includes depositing an insulating layer 904 and a biasing layer 906. The biasing layer 906 may be a hard bias layer or a soft bias layer, depending on the desired embodiment. The insulating layer 904 may include Al2O3 in one approach. However, according, to various other approaches, the insulating layer 904 may include any insulating material known in the art.

Figure 9D:
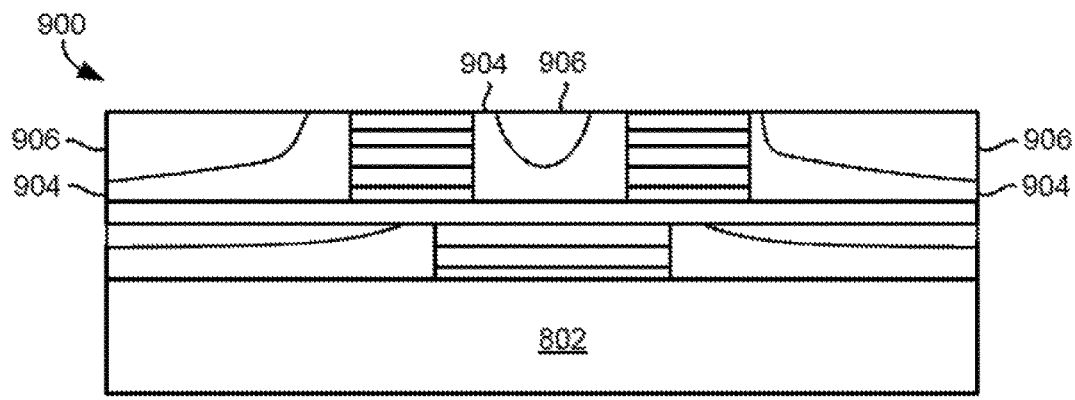

Method 900 further includes performing a liftoff procedure in addition to a CMP step. As illustrated in FIG. 9D, these steps remove part of the insulating layer 904 and biasing layer 906, in addition to the masking layers 814, thereby exposing part of the sensor structures 816, 817.

Figure 9E:
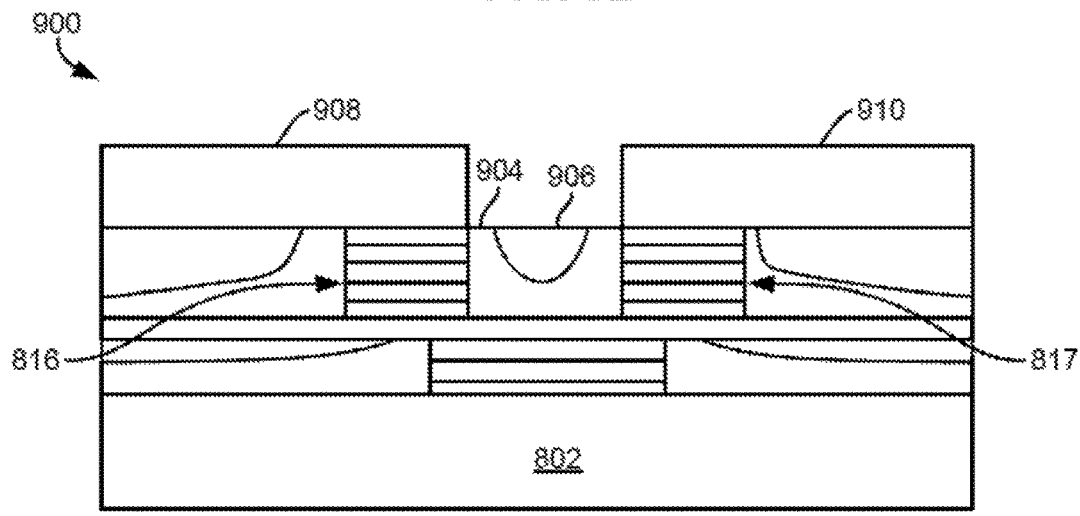

Furthermore, in FIG. 9E, method 900 includes forming two leads 908, 910 (e.g., shields) that allow for independent access to the respective sensor structures 816, 817. Depending on the desired embodiment, leads 908, 910 may include the same or different design and/or construction from each other and/or lead 802.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and then equivalents.

What is claimed is:

1. A magnetic head comprising:
a plurality of read sensors positioned along a track direction and spaced apart in a cross track direction that is perpendicular to the track direction;
a plurality of independent leads, wherein each of the plurality of read sensors is coupled to one of the plurality of independent leads;
at least one shared lead, wherein the at least one shared lead is coupled to at least two of the plurality of read sensors; and
a biasing layer associated with each of the plurality of read sensors in the cross track direction to provide magnetic stability to the plurality of read sensors,
wherein a width of the biasing layer is forty percent to fifty percent of a center to center track pitch of a magnetic medium.

2. The magnetic head of claim 1, wherein the plurality of read sensors comprises a first read sensor, a second read sensor, and a third read sensor, and wherein a portion of the second read sensor overlaps with a portion of the first read sensor and a portion of the third read sensor in the cross track direction.

3. The magnetic head of claim 2, wherein the second read sensor has a width in the cross track direction that is larger than a width of the first read sensor and a width of the third read sensor in the cross track direction.

4. The magnetic head of claim 2, wherein a width of the first read sensor, the second read sensor, and the third read sensor is at least seventy percent of the center to center track pitch of the magnetic medium.

5. The magnetic head of claim 2, wherein the first read sensor and the third read sensor are oriented along a common line in the cross track direction.

6. The magnetic head of claim 2, wherein each of the first read sensor, the second read sensor, and the third read sensor are offset from one another in the track direction.

7. The magnetic head of claim 2, wherein a spacing between the first read sensor and the second read sensor in the track direction, and between the third read sensor and the second read sensor in the track direction is less than about one hundred nanometers.

8. The magnetic head of claim 2, wherein a spacing between the plurality of read sensors that are positioned along a common line in the cross track direction is less than one hundred percent of the center to center track pitch of the magnetic medium.

9. The magnetic head of claim 2, wherein the plurality of independent leads comprises three independent leads, and wherein each of the first read sensor, the second read sensor, and the third read sensor is coupled to one of the three independent leads.

10. The magnetic head of claim 2, wherein the first read sensor and the third read sensor are coupled to the at least one shared lead.

11. The magnetic head of claim 2, wherein the first read sensor, the second read sensor, and the third read sensor are all coupled to the at least one shared lead.

12. The magnetic head of claim 1, wherein the biasing layer is on either side of each of the plurality of read sensors in the cross track direction.

13. A system comprising:
a magnetic medium having a center to center track pitch; and
a magnetic head configured to simultaneously read at least three adjacent data tracks of the magnetic medium, the magnetic head comprising:
a plurality of read sensors positioned along a track direction and spaced apart in a cross track direction that is perpendicular to the track direction;
a plurality of independent leads, wherein each of the plurality of read sensors is coupled to one of the plurality of independent leads;
at least one shared lead, wherein the at least one shared lead is coupled to at least two of the plurality of read sensors; and
a biasing layer associated with each of the plurality of read sensors in the cross track direction to provide magnetic stability to the plurality of read sensors,
wherein a width of the biasing layer is forty percent to fifty percent of the center to center track pitch of the magnetic medium.

14. The system of claim 13, further comprising a signal processing unit coupled to the plurality of independent leads and the at least one shared lead, wherein the signal processing unit is configured to at least one of apply waveform shaping, detect signals from the plurality of read sensors, differentiate between data read from the adjacent data tracks of the magnetic medium, and apply a timing offset to the signals from the plurality of read sensors.

15. The system of claim 13, wherein the biasing layer is on either side of each of the plurality of read sensors.

16. The system of claim 13, wherein each of the plurality of independent leads comprises at least one of W, Ta, Rh, Ru, and Cu.

17. The system of claim 13, wherein a width of each of the plurality of read sensors is at least seventy percent of the center to center track pitch of the magnetic medium.

18. A magnetic head comprising:
a first read sensor configured to read data from a first data track of a magnetic medium associated with the magnetic head;
a second read sensor configured to read data from a second data track of the magnetic medium;

a third read sensor configured to read data from a third data track of the magnetic medium, wherein the first data track, the second data track, and the third data track are adjacent data tracks of the magnetic medium, and wherein the second read sensor is further configured to read the data from the first data track and the third data track;

a shared lead coupled to the first read sensor and the third read sensor;

a plurality of independent leads, wherein the first read sensor, the second read sensor, and the third read sensor are coupled to one of the plurality of independent leads; and a biasing layer associated with the first read sensor, the second read sensor, and the third read sensor in the cross track direction to provide magnetic stability, wherein a width of the biasing layer is forty percent to fifty percent of a center to center track pitch of the magnetic medium.

19. The magnetic head of claim 18, further comprising a fourth read sensor coupled to the shared lead along with the first read sensor and the third read sensor.

20. The magnetic head of claim 19, further comprising a fifth read sensor oriented along a first common line with the second read sensor in a cross track direction, and wherein the first read sensor, the third read sensor, and the fourth read sensor are oriented along a second common line in the cross-track direction.

* * * * *